Patented Oct. 2, 1951

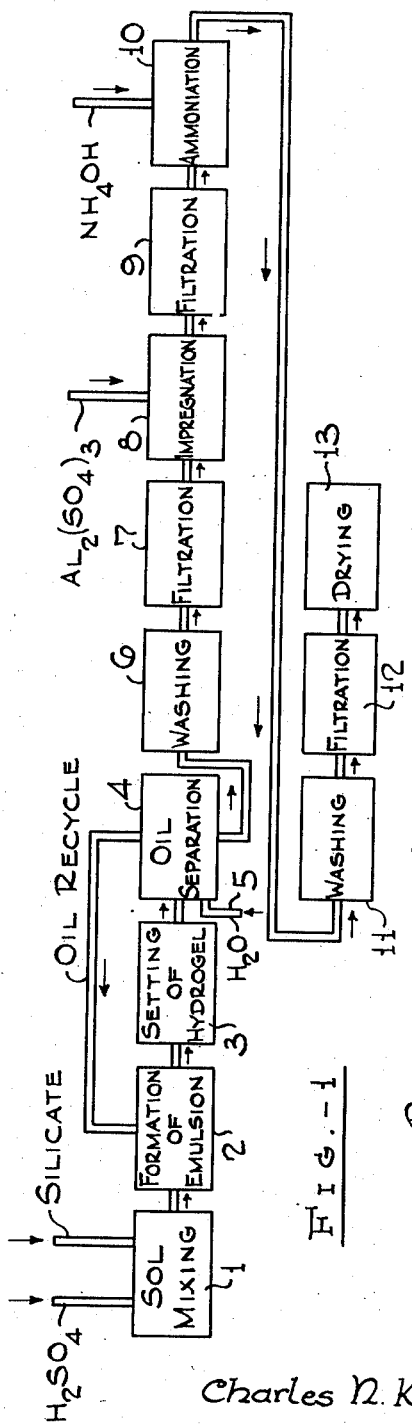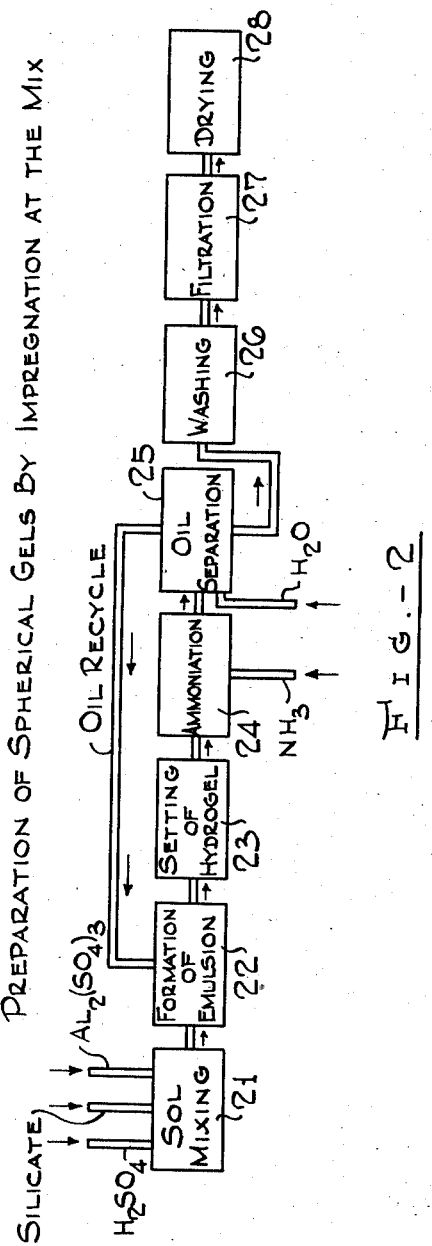

2,570,063

UNITED STATES PATENT OFFICE 2,570,063

TREATMENT OF MICROSPHERICAL PARTICLES TO RENDER THEM NONAGGLOMERATING

Charles N. Kimberlin, Jr., Baton Rouge, La., assignor to Standard Oil Development Company, a corporation of Delaware Application April 12, 1949, Serial No. 86,933

5 Claims. (Cl. 252—448)

1

This invention relates to a method for the preparation of adsorbent gels and relates more particularly to a method for the preparation of plural gels. This application is a continuation-in-part of my application Serial No. 599,137, filed June 13, 1945, now abandoned.

Inorganic gels are well known and have been long used for various purposes, for example for the adsorption of condensible vapors from gaseous carriers and for catalytic purposes either as the catalyst itself or as a component thereof or as a carrier. The most widely used of these inorganic gels in the dried condition is that of silica with or without the addition of other gelatinous materials such as alumina.

Such gels have been found to be particularly useful as catalysts for carrying out reactions involving hydrocarbons and particularly in the so-called fluid catalyst process in which the catalyst is in a powdered form and is aerated or fluidized by means of a gas so that it acquires the properties of a liquid such as fluid flow, hydrostatic pressure and the like. The hydrostatic pressure property of these powdered catalysts is made use of in circulating the powdered catalyst through the reactor and regenerator system. These powdered catalysts are generally prepared by grinding silica gel or other types of gel catalysts to the desired size.

It has recently been found that catalysts having a particle size within the desired range for the fluid catalyst process, that is between 20 and 120 microns, can be prepared by emulsifying a sol of the desired gel-forming substance in a water-immiscible medium, such as oil, or an at most partially water-miscible organic liquid medium such as butanol or the like. By maintaining the sol in emulsified or dispersed condition in such media until it has become converted to the gel form, small spherical or spheroidal particles having diameters less than 1 mm. are obtained. These microspheres are washed at room temperature and dried usually in air, and then heated to a temperature of about 850°–1200° F. for activation.

It has been found, however, when the gel microspheres prepared by this emulsion technique are dried in air, the gel particles tend to agglomerate into compact masses. These agglomerated masses cannot be broken down to restore the microspheres to their original, discrete, spheroidal particle form and accordingly, the advantages to be gained by forming the gel particles in spherical or spheroidal form are not attained.

It has been proposed to overcome this problem

2 of agglomeration by drying the hydrogel particles in the presence of a water-immiscible material such as mineral oil or kerosene or in the presence of an organic liquid which is only partially miscible with water such as normal butanol and the like.

These methods of drying hydrogel microspheres are so inconvenient and costly that methods which overcome this agglomeration and which increase the stability of air-dried spheres to steam and heat are greatly to be desired.

It is, therefore, the main object of this invention to provide a method of treating plural hydrogel microspheres which reduces or prevents agglomeration of the microspheres during drying which is easily controlled and which improves the stability of the air-dried hydrogels to heat and steam.

It is a further object of this invention to provide a method for preparing plural gel catalysts in microspherical form as separate discrete particles which are stable to high temperatures and steam, which method avoids costly and inconvenient drying procedures.

These and other objects of this invention are accomplished by subjecting the impregnated hydrogel microspheres to elevated temperatures for a sufficient period to render them non-agglomerating either before, during or after the washing step. Hydrogel microspheres subjected to such conditions may be readily dried in air without agglomeration and are found to be as stable to steam and high temperature as those dried in the presence of oil or alcohol.

Microspherical gel catalysts which may be processed according to this invention are obtained by preparing a simple sol and causing the sol to set while maintained in suspension in a water-immiscible medium, such as mineral oil, by means of agitation and preferably in the presence of an emulsifying agent, such as lecithin or organic sulfonates such as sulfonated hydrocarbons or the like. The setting step is usually carried out at a temperature between 140° and 180° F. in order to take advantage of the higher rate of setting at the elevated temperature. After setting, the hydrogel microspheres are transferred to water by introducing the water beneath the suspension. The hydrogel spheres settle through the oil without difficulty. They are readily transferred from one vessel to another by means of a stream of water or by pumping as a slurry. The particle size of these spheres is controlled by the viscosity of the oil used as the suspension medium, by the turbulence of the suspension, by the amount of emulsifier employed, and by the oil to sol ratio which may vary from 1 to 1 to 10 to 1. The emulsification of the hydrosol and the setting thereof to the hydrogel may be carried out in any convenient type of agitator, but an agitator having a central draft tube is particularly effective.

When it is desired to prepare a plural gel, either the simple hydrosol may be impregnated with the added component or the added component may be added to the simple hydrogel. These two schemes are shown in Figures 1 and 2.

Referring, therefore, to the drawings, the conventional method is shown in Figure 1. According to this method a sol, such as silica sol, is prepared in tank 1 by mixing the desired amounts of sodium silicate and acid. The simple sol thus formed is emulsified in mineral oil in agitator 2. This agitator may be of any conventional type. An emulsifying agent, such as lecithin, is preferably used to keep the material in suspension. The emulsion is then passed to setting tank 3 where the sol is allowed to remain until it sets to a hydrogel. The temperature in this tank is maintained at that most convenient for gelation, preferably 140°–180° F. Agitation is employed during the setting to maintain the sol droplets in dispersed condition. After the sol has set to a hydrogel, it is passed to separator 4 into which water is introduced through line 5. The gel particles settle to the bottom into the water layer or phase, while the oil rises to the top. Since the hydrogel particles are more easily wetted by the water than the oil, they easily pass into the water layer or phase. The aqueous slurry of small gel particles is conducted to washer 6 where it is thoroughly washed with water, preferably in countercurrent. The washed particles are then separated from the water in filter 7. After filtering, the spherical particles are conducted to impregnation tank 8 where they are thoroughly soaked in the desired impregnating agent. Suitable impregnating agents include aluminum salts, such as aluminum sulfate, aluminum chloride, aluminum nitrate and soluble salts of zirconium, tungsten, platinum, palladium, iron, chromium, nickel, titanium, thorium, etc. For the purposes of this description the impregnating agent will be considered to be aluminum sulfate. After impregnation, the spheres are passed through filter 9 to remove the excess impregnating liquor. After filtering, the impregnated spheres are treated with ammonia in tank 10 in order to fix the alumina. Following this treatment they are again washed with water in tank 11 to remove salts and ammonia. The washed particles are passed through filter 12 and dried in air oven heated to 350° F., indicated generally at 13.

In Figure 2 is shown a method of preparing the plural gels by impregnating the sol directly. In this case, a silica sol is formed and an aluminum salt is added directly thereto or two different salts, such as sodium silicate and aluminum sulfate are mixed with sulfuric acid in tank 21, and the resulting plural sol is emulsified in mineral oil and allowed to set to a hydrogel in tanks 22 and 23 as described in Figure 1. However, in this case, the gel particles are treated with ammonia in tank 24 as soon as they have set or formed, using gaseous ammonia instead of aqueous ammonia as described in connection with tank 10 in Figure 1. Following the fixing treatment in tank 24, the oil is separated from the hydrogel in tank 25 in the same manner as in tank 4 of Figure 1. The separated hydrogel is then washed with water in tank 26. As indicated above, this washing may be concurrent or countercurrent. The washed hydrogel is then passed through filter 27 and dried at 28 in the same manner as in Figure 1.

This latter procedure has the advantage that it eliminates one washing and two filtering steps.

According to this invention, it has been found that gels which have less tendency to agglomerate during the drying and which have great stability toward heat and steam when dried in air can be prepared by heating the hydrogel at an elevated temperature either before, during or after the washing step or steps. The washing and heating steps may be combined by using hot water for washing. However, the unwashed gel may be steamed at 212° F. and then washed either with hot or cold water. In the process of Figure 1, the gel may be subjected to two heating steps before, during or after each washing step, or the first washing step may be accompanied by a heating step while the second washing step may not. In any case, the temperatures of the heating step vary between 150° and 212° F. and the treatment is continued until the gel particles are rendered non-agglomerating. Generally, between 1 and 24 hours is sufficient.

The advantages of preparing gels according to the present invention are shown in the following examples.

EXAMPLE 1

An impregnated hydrosol was prepared by successively adding to 500 volumes of sulfuric acid, sp. gr. 1.19, 400 volumes of water, 1000 volumes of sodium silicate, $Na_2O.3.25\ SiO_2$, sp. gr. 1.21, and 500 volumes of aluminum sulfate solution, sp. gr. 1.31. The sol was set to a hydrogel in the form of microspherical particles by the above-described method. The hydrogel was treated with ammonia (0.0228 lb. $NH_3$ per lb. of hydrogel) to fix the alumina, and divided into several portions each of which was washed at a different temperature. The washed samples were dried in a steam oven.

The samples prepared as described above were tested for cracking activity by employing them as catalysts for the cracking of East Texas gas oil at 850° F. and a feed rate of 0.6 volume of oil per volume of catalyst per hour. The product obtained was distilled by the Engler method and the amount of product distilling over at a temperature below 400° F. plus the loss was determined and calculated as percent D+L. The greater the percent D+L, the better the cracking properties or activity of the catalyst were considered to be. The data obtained are shown below.

| Catalyst Treatment | Product Per Cent D+L at 400° F. | | |
|---|---|---|---|
| | Act. at 850° F. | 3 Hrs. at 1600° F. | Steamed 24 Hrs. at 1050° F. 60 p. s. i. g. |
| Washing Temperature: | | | |
| 80–90° F | 42.5 | 11 | |
| 125° F | | 13 | 22.5 |
| 150° F | | 36 | 21.5 |
| 200° F | 54 | 40.5 | 32 |

These data strikingly illustrate the unexpected improvement to be obtained by washing this type of hydrogel at temperatures in the range of 150°–200° F. as indicated by the high D+L, particularly after heating to 1600° F. and steaming at 1050° F.

EXAMPLE 2

An impregnated hydrogel was prepared by adding 20% alumina to the simple silica hydrogel prepared by mixing equal volumes of sodium silicate ($Na_2O.3.25\ SiO_2$) having a specific gravity of 1.21 and sulfuric acid having a specific gravity of 1.19 and setting to a hydrogel in the form of microspherical particles by the above-described method. The impregnated hydrogel was then treated with 0.022 pound of ammonia per pound of hydrogel to fix the alumina and it was divided into several portions, each of which was washed under different conditions. The washed samples were dried in air in a steam oven, and the results obtained are shown in the following table. The samples which were treated at elevated temperatures before drying in accordance with the present invention did not agglomerate when dried in the steam oven.

*Microspherical $SiO_2$-$Al_2O_3$ dried in steam oven—Impregnation of hydrogel: 20% $Al_2O_3$ except as noted*

| Catalyst No. | Washing and Hot Water Treating Procedure [1] | Approx. Time at Elevated Temp. Hrs. | Apparent Density | Per Cent D+L | | |
|---|---|---|---|---|---|---|
| | | | | Act. at 850° F. | 3 Hrs. at 1600° F. | Steamed 24 Hrs. at 1050° F., 60 p.s.i.g. |
| 1 | Washed at 80–90° F. before and after impregnation. | 0 | 0.68 | 60 | 26.5 | 20.5 |
| 2 | Washed at 80–90° F. before and after impregnation, refluxed in water at about 212° F. for 10 hours before drying. | 10 | 0.62 | 55 | 41 | 25.5 |
| 3 | Washed at 150° F. before and after impregnation. | 24 | 0.58 | 58 | 48.5 | 32 |
| 4 | Washed at 200° F. before and after impregnation. | 24 | 0.68 | | 39 | 30 |
| 5 | Washed at 200° F. before impregnation; at 80–90° F. after impregnation. | 6 | 0.68 | 61 | 46 | 27 |
| 6 | Heated to 212° F. (with open steam), let stand in hot water overnight (final temperature 170° F.), washed at 80–90° F. before and after impregnation. | 17 at 170° to 212° F. | 0.70 | 58 | 46 | 29.5 |
| 7 | Heated 6 hours at 212° F. (open steam), washed at 80–90° F. before and after impregnation. | 6 | 0.59 | | 41 | 23 |
| 8 | Washed at 80–90° F., heated 5 Hrs. at 212° F. (open steam) and let stand overnight in hot water (final temperature = 140° F.) impregnated and washed at 80–90° F. | 5+ | 0.62 | 48.5 | 45 | 26 |
| 9 | Similar to 6 except prepared from a more concentrated silica hydrosol. [2] | 5+ | 0.55 | 51 | 41.5 | |
| 10 | Same as 6 except 30% $Al_2O_3$. | 17 at 170 to 212° F. | 0.68 | 55 | 49 | 31.5 |
| 11 | Same as 6 except 40% $Al_2O_3$. | 17 at 170 to 212° F. | 0.46 | 54 | 46.5 | 37.5 |

[1] All samples were washed with distilled water.
[2] The sol used in the preparation of this sample was prepared from 1000 volumes of $Na_2O.3.25\ SiO_2$, sp. gr. 1.21, and 720 volumes of sulfuric acid, sp. gr. 1.21.

It is evident from the above data that the gel catalyst prepared either by impregnating the hydrosol or by impregnating the hydrogel and then washing at high temperatures gives improved stability to heat and steam. The fact that the gel particles treated in accordance with the present invention dried without agglomeration is of substantial advantage since the particles are obtained as true microspheres and without grinding, which would destroy the spheroidal shape of the particles.

The nature and objects of the present invention having been thus described and illustrated, what is claimed as new and useful and is desired to be secured by Letters Patent is:

1. In a process for preparing a heat and steam stable gel catalyst in microspherical particle form and containing silica and adapted for use in the conversion of hydrocarbon oils, wherein a silica containing sol is emulsified in a water immiscible liquid and the resulting emulsion is agitated for such a time and to such a degree as to form discrete spherical hydrogel particles which are washed, dried and activated and which when dried are composed mostly of microspherical particles below about 120 microns in size; the method of reducing the agglomerating tendency of said discrete microspherical particles during said drying treatment which comprises treating the freshly formed discrete microspherical hydrogel particles before said drying treatment with water maintained at a temperature between 150° F. and 212° F. for a period between about 5 and 24 hours and sufficient to substantially eliminate the agglomerating tendency of said particles during said drying treatment.

2. In a process for preparing a heat and steam stable gel catalyst in microspherical particle form and containing silica and alumina and adapted for use in the conversion of hydrocarbon oils, wherein sulfuric acid, sodium silicate and aluminum salt solutions are mixed to form a plural silica-alumina sol which is then emulsified in a water immiscible liquid and the resulting emulsion is agitated for such a time and to such a degree as to form discrete, spherical hydrogel particles which are washed, dried and activated and which when dried are composed mostly of microspherical particles below about 120 microns in size; the improvement of substantially eliminating the agglomerating tendency of the discrete microspherical hydrogel particles during said drying treatment which comprises treating the freshly formed discrete microspherical hydrogel particles before said drying treatment with water maintained at a temperature between about 150° F. and 212° F. for a period between about 5 and 24 hours.

3. In a process for preparing a heat and steam stable gel catalyst in microspherical particle form and containing silica and alumina and adapted for use in the conversion of hydrocarbon oils, wherein sulfuric acid, sodium silicate and aluminum salt solutions are mixed to form a plural silica-alumina sol which is then emulsified in a water immiscible liquid and the resulting emulsion is agitated for such a time and to such a degree as to form discrete, spherical hydrogel particles which are washed, dried and activated and which when dried are composed mostly of microspherical particles below about 120 microns in size; the improvement which comprises treating the freshly formed discrete microspherical hydrogel particles with water maintained at a temperature between about 150° F. and 212° F. for a period between about 5 and 24 hours to substantially eliminate the agglomerating tendency of the discrete microspherical hydrogel particles during the subsequent drying treatment and then drying the treated hydrogel particles to obtain discrete dry microspherical catalyst particles.

4. In a process for preparing a heat and steam stable gel catalyst in microspherical particle form and containing silica and alumina and adapted for use in the conversion of hydrocarbon oils, wherein a silica-containing sol is emulsified in a water immiscible liquid and the resulting emulsion is agitated for such a time and to such a degree as to form discrete spherical hydrogel particles which are impregnated with an aluminum salt which is then converted to alumina and the impregnated microspherical gel particles are then washed, dried and activated and which when dried are composed mostly of microspherical particles below about 120 microns in size; the method of reducing the agglomerating tendency of said discreate microspherical particles during said drying treatment which comprises treating the freshly formed discrete microspherical hydrogel particles before and after impregnation but before said drying treatment with water maintained at a temperature between about 150° F. and 212° F. for a total treating time between about 5 and 24 hours and sufficient to substantially eliminate the agglomerating tendency of said particles during said drying treatment.

5. In a process for preparing a heat and steam stable gel catalyst in microspherical particle form and containing silica and alumina and adapted for use in the conversion of hydrocarbon oils, wherein a silica containing sol is emulsified in a water immiscible liquid and the resulting emulsion is agitated for such a time and to such a degree as to form discrete spherical hydrogel particles which are impregnated with an aluminum salt which is then converted to alumina and the impregnated microspherical gel particles are then washed, dried and activated and which when dried are composed mostly of microspherical particles below about 120 microns in size; the method of reducing the agglomerating tendency of said discrete microspherical particles during said drying treatment which comprises treating the freshly formed discrete microspherical hydrogel particles after impregnation but before said drying treatment with water maintained at a temperature between about 150° and 212° F. for a period between about 5 hours and 24 hours and sufficient to substantially eliminate the agglomerating tendency of said particles during said drying treatment.

CHARLES N. KIMBERLIN, Jr.

REFERENCES CITED

The following references are of record in the file of this patent:

UNITED STATES PATENTS

| Number | Name | Date |
| --- | --- | --- |
| 1,762,228 | Holmes | June 10, 1930 |
| 1,772,055 | Miller et al. | Aug. 5, 1930 |
| 2,310,278 | Connolly | Feb. 9, 1943 |
| 2,356,303 | Connolly | Aug. 22, 1943 |
| 2,384,943 | Marisic | Sept. 18, 1945 |
| 2,387,596 | Marisic | Oct. 23, 1945 |
| 2,435,379 | Archibald | Feb. 3, 1948 |